Oct. 31, 1967 H. C. CHRISTIANSEN 3,350,550
AMPLIFIERLESS CASCADE RESOLVERS WITH MEANS TO MINIMIZE PHASE SHIFT BETWEEN STAGES
Filed Nov. 8, 1963
2 Sheets-Sheet 1
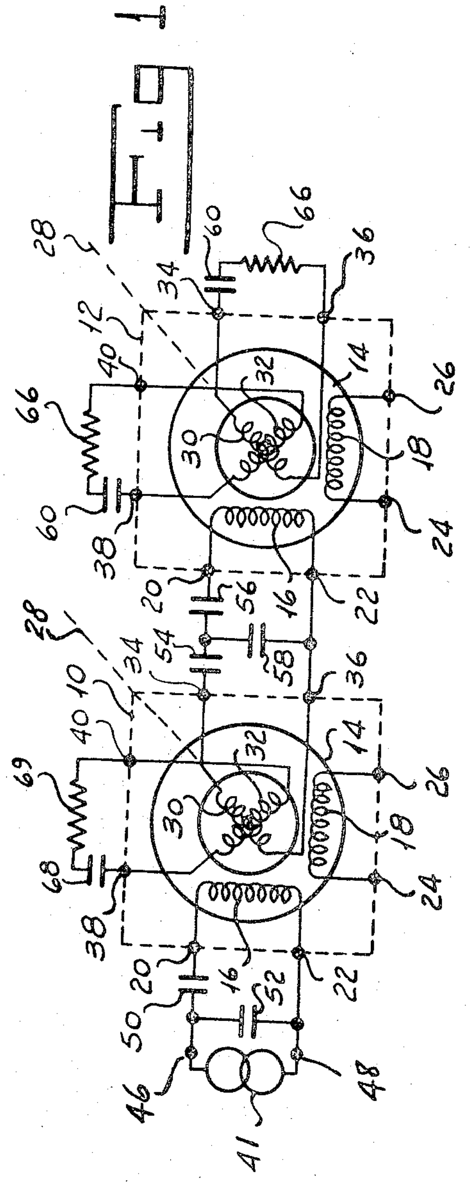
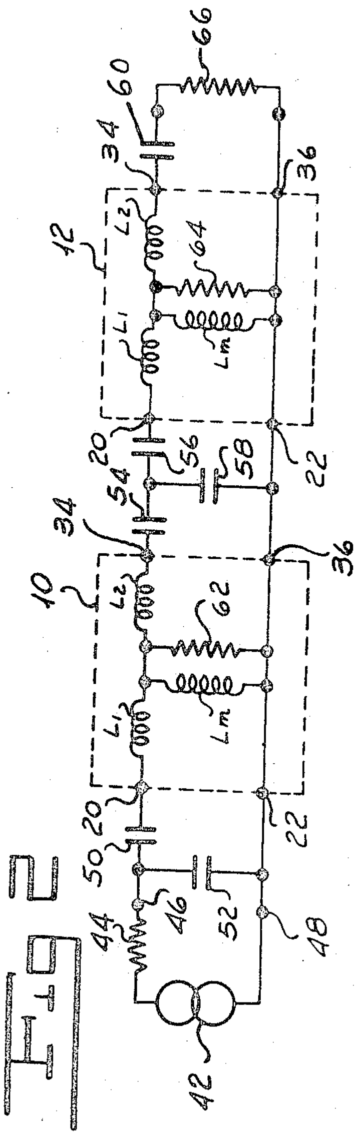
FIG. 2
INVENTOR.
HOWARD C. CHRISTIANSEN
BY
Shenier & O'Connor
ATTORNEYS INVENTOR.
HOWARD C. CHRISTIANSEN
BY
Shenier & O'Connor
ATTORNEYS United States Patent Office 3,350,550
Patented Oct. 31, 1967

3,350,550
AMPLIFIERLESS CASCADE RESOLVERS WITH MEANS TO MINIMIZE PHASE SHIFT BETWEEN STAGES

Howard C. Christiansen, Norwalk, Conn., assignor to United Aircraft Corporation, East Hartford, Conn., a corporation of Delaware
Filed Nov. 8, 1963, Ser. No. 322,411
12 Claims. (Cl. 235—189)

This application is a continuation-in-part of my copending application Ser. No. 137,403, filed Sept. 11, 1961, now abandoned.

My invention relates to cascaded resolvers and more particularly to an improved system of cascaded resolvers which does not require the use of buffer amplifiers between stages.

Resolvers are known in the prior art for producing sine and cosine functions of an input signal in response to displacement of the resolver shaft. In many instances such, for example, as where resolvers are employed in computers requiring products of functions, resolvers are cascaded to produce the required products. In the prior art where resolvers are cascaded in this manner, it is necessary to employ buffer amplifiers to isolate successive stages to prevent undesirable interaction between stages. That is, if such buffer amplifiers are not employed, loading of the output windings results in an error in the output. Further, there results undesirable phase shift from one stage to the succeeding stage.

I have invented a system of cascaded resolvers which does not require interstage buffer amplifiers. My system prevents the undesirable effects which would result from directly coupling the output of one resolver to the input of a resolver of a succeeding stage. My system minimizes phase shift between stages.

One object of my invention is to provide a system for cascading resolvers which does not require the use of buffer amplifiers between stages.

Another object of my invention is to provide a system of cascaded resolvers which prevents the undesirable effects which would result from directly connecting the output of one stage of cascaded resolvers to the input of a succeeding stage.

A further object of my invention is to provide a system of cascading resolvers without employing interstage amplifiers while preventing any appreciable phase shift through the system.

Other and further objects of my invention will appear from the following description.

In general my invention contemplates the provision of a system of cascaded resolvers wherein I employ series-connected capacitors to neutralize the leakage reactances of the resolvers and parallel-connected capacitors to neutralize the magnetizing inductances of the resolvers to provide zero phase shift from resolver to resolver to permit me to cascade the resolver without the use of intermediate amplifiers.

In the accompanying drawings which form part of the instant specification and which are to be read in conjunction therewith and in which like reference numerals are used to indicate like parts in the various views:

FIGURE 1 is a schematic diagram of one form of my cascaded resolver system.

FIGURE 2 is a schematic diagram of an equivalent circuit of the form of my system illustrated in FIGURE 1 along one axis thereof.

Figure 3:
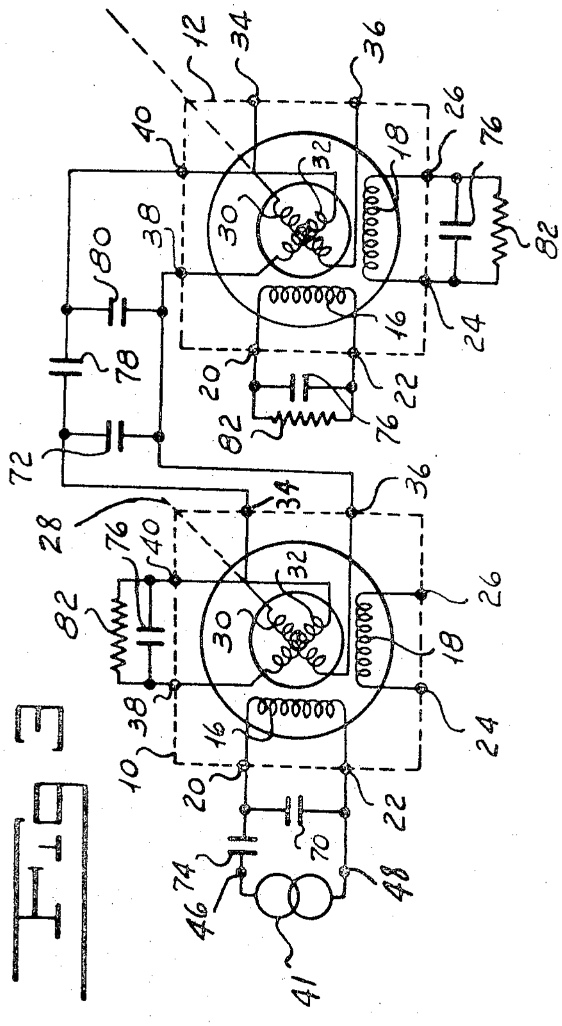
FIGURE 3 is a schematic diagram of another form of my cascaded resolver system.

Referring to FIGURE 1, for purposes of simplicity in exposition, I have shown a cascaded resolver system including two resolvers 10 and 12, it being understood that I may employ as many resolvers as are necessary or desirable in the cascaded chain. Each resolver 10 and 12 comprises a core 14 carrying stator windings 16 and 18 disposed at right angles to each other. Each winding 16 has terminals 20 and 22 while each winding 18 has terminals 24 and 26. The input shaft 28 of each resolver 10 and 12 carries respective mutually perpendicular rotor windings 30 and 32 provided with respective pairs of terminals 34 and 36 and 38 and 40. A generator 41 having output terminals 46 and 48 energizes the cascaded system of resolvers.

Referring now to FIGURE 2, I have shown a T equivalent circuit of the system illustrated in FIGURE 1. The generator 41 is represented as an ideal generator 42 having an internal resistance 44. The leakage inductances are illustrated respectively as the primary leakage inductance $L_1$ and the secondary leakage inductance $L_2$. $L_m$ represents the magnetizing inductance while resistor 62 represents the resistive losses in the resolver 10. The leakage inductances $L_1$ and $L_2$ and the magnetizing inductance $L_m$ of the resolver 12 are similarly shown. A resistor 64 represents the resistive losses in resolver 12. In the equivalent circuit shown in FIGURE 2, I have assumed a unity turns ratio and also have assumed that the primary and secondary leakage inductances $L_1$ and $L_2$ are equal to each other.

The essence of my invention is the use of series-connected capacitors for neutralizing leakage inductance and the use of parallel-connected capacitors to neutralize magnetizing inductance to provide zero phase shift through the system. In the arrangement illustrated in FIGURE 2, I connect a capacitor 50 in series between the terminal 46 and the terminal 20. Capacitor 50 is so selected that it resonates with the inductance $L_1$ effectively to neutralize the primary leakage inductance of the resolver 10. I connect a parallel capacitor 52 across terminals 46 and 48 and so select its value that it resonates with the inductance $L_m$ effectively to neutralize this magnetizing inductance of the resolver 10. A second series capacitor 54 connected to the terminal 34 neutralizes the leakage inductance $L_2$ of the secondary winding 30.

In coupling the winding 30 to the winding 16 of the resolver 12, I connect a capacitor 56 between the capacitor 54 and terminal 20 to neutralize the leakage inductance $L_1$ of the winding 16. A parallel capacitor 58 connected between the common terminal of capacitors 54 and 56 and a line connecting terminals 36 and 22 is so selected as to resonate with the magnetizing inductance $L_m$ of resolver 12. A capacitor 60 connected to the output terminal 34 of resolver 12 neutralizes the secondary leakage inductance $L_2$ of resolver 12. Another capacitor 60 connected to ouput terminal 38 of resolver 12 neutralizes the leakage inductance of winding 32. I terminate the windings 30 and 32 in balanced impedances 66 so that the input impedance is the same for all positions of shaft 28. Thus, I prevent distortion of the output for less than maximum coupling. I connect a capacitor 68 which neutralizes the leakage inductance of winding 32 of resolver 10 to the terminal 38 and terminate the winding 32 with a balanced impedance 69.

From the foregoing it will be appreciated that all of the series-connected capacitors 50, 54, 56, 60 and 68 are selected to have values such that they resonate with the leakage inductances of the windings with which they are associated effectively to neutralize these leakage inductances. Similarly, the capacitors 52 and 58 are selected to have values such that they resonate with the magnetizing inductances of the resolvers with which they are associated effectively to neutralize the magnetizing inductances providing substantially zero phase shift throughout the system. While I have shown only one capacitor, such as the capacitor 52, associated with resolver 10 and have indicated that this capacitor is connected in parallel at the input to the resolver, it will readily be appreciated that I may, if desired, split the capacitor into two parallel-connected capacitors, one at the input for neutralizing half the magnetizing inductance and another at the output to neutralize the other half of the magnetizing inductance. By properly selecting the capacitors to produce the results outlined above, I can arrive at a configuration which provides the most desirable arrangement for convenience in producing the resolvers as packages which incorporate neutralizing capacitors.

Referring now to FIGURE 3, I have shown an alternate form of my system of cascaded resolvers in which I connect the rotor winding 30 of resolver 10 to the rotor winding 32 of the resolver 12.

Figure 4:
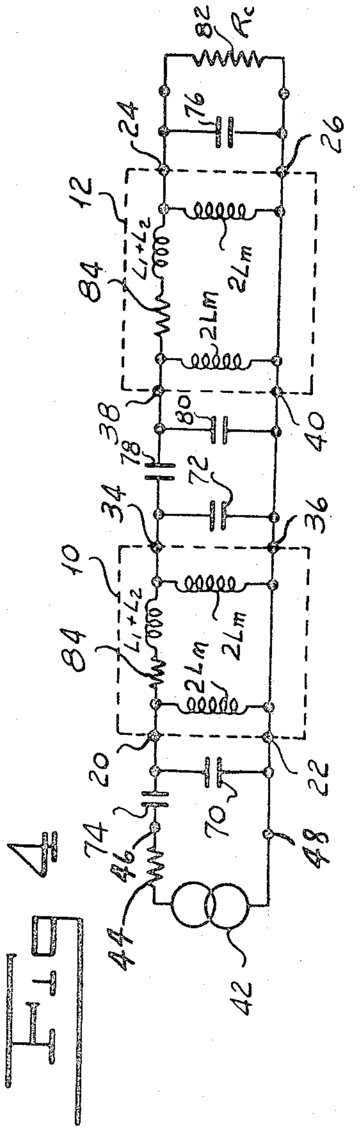
FIGURE 4 is a schematic diagram of an equivalent circuit of the form of my cascaded resolver system shown in FIGURE 3 along one axis thereof.

Referring now to FIGURE 4, I have illustrated a "pi" equivalent circuit for the arrangement shown in FIGURE 3. In this form of equivalent circuit, the leakage inductances $L_1$ and $L_2$ are illustrated as a lumped inductor and the magnetizing inductance $L_m$ is represented by two parallel branch inductors, each having a value $2L_m$. In this arrangement, I connect respective capacitors 70 and 72 across the pairs of input terminals 20 and 22 and 34 and 36. Each of the capacitors 70 and 72 has a value such that it resonates with $2L_m$ and these capacitors 70 and 72 effectively neutralize the magnetizing inductance of the resolver 10. Having neutralized the magnetizing inductance, it can be neglected in the further analysis of the system. I connect a series capacitor 74 between terminal 46 and the input terminal 20 and so select its value that it resonates with the leakage inductance $L_1+L_2$ to neutralize the same.

I neutralize the leakage and magnetizing inductances of the resolver 12 in a similar manner. Capacitors 76 and 80 connected respectively across terminals 24 and 26 of winding 18 of resolver 12 and across terminals 38 and 40 of winding 32 of resolver 12 resonate with the branch magntizing inductances $2L_m$. A capacitor 78 connected between the output terminal 34 of winding 30 of resolver 10 and the terminal 40 of winding 32 of resolver 12 has a value such that it resonates with $L_1+L_2$ to neutralize the effect of leakage inductance. I connect parallel capacitors 76 across the other winding 32 of resolvers 10 and 16 and 18 of resolver 12 which are terminated in impedances 82. As in the form of my invention shown in FIGURES 1 and 2, I terminate the output windings in balanced loads indicated by resistors 82. Series resistors 84 represent copper losses in resolvers 10 and 12.

In operation of the form of my invention shown in FIGURES 1 and 2, the series capacitors 50 and 54 resonate with the primary leakage inductance $L_1$ and the secondary leakage inductance $L_2$ respectively of resolver 10 to neutralize these inductances. The parallel capacitor 52 is so selected that it resonates with the mutual inductance $L_m$ of resolver 10. The series capacitors 56 and 60 connected across the windings 16 and 30 of resolver 12 neutralize the effect of the primary and secondary leakage inductances of these windings. Similarly, the series capacitors 60 and 68 connected across the windings 32 of the respective resolvers 12 and 10 neutralize the leakage inductances of these windings. Parallel capacitor 58 neutralizes the effect of the magnetizing inductance $L_m$ of resolver 12. Resistors 66 and 69 provide balanced loads to ensure that the input resistance is the same at all positions of the shaft to prevent distortion in the outputs.

In the form of my invention shown in FIGURES 3 and 4, I employ parallel capacitors 70 and 76 to neutralize the magnetizing inductance of the resolver 10 by resonating with the inductances $2L_m$ shown in FIGURE 4. With these inductances neutralized, their effect can be neglected. I then employ a series capacitor 74 to neutralize the lumped leakage inductances $L_1+L_2$ of resolver 10. I compensate the resolver 12 in a similar manner and terminate all output windings in balanced loads 82.

It can be seen that each form of my invention reduces to a purely resistive circuit comprising the input resistance 44, the load resistance 66 or 82, and the resolver loss resistance 62 and 64 or 82. These resolver loss resistances include the attenuation effects of both core loss and copper loss. Thus in FIGURE 2, resistors 62 and 64 include not only core loss but also the approximate parallel equivalent of series copper loss; and in FIGURE 4 resistors 84 include not only copper loss but also the approximate series equivalent of shunt core loss. Such approximate series-parallel equivalents may be employed since the resistive attenuation introduced by the resolvers is small. The circuit of FIGURE 4 involves a further approximation in the values of the equivalent pi magnetizing inductances. This approximation may be used since the leakage inductances are small compared with the magnetizing inductances.

It is to be understood, of course, that while I have shown only two cascaded resolvers in each form of the invention, I may employ as many resolvers in the chain as are desirable and practicable. Further, I may split the various neutralizing capacitors in such a manner as permits me to make the most convenient package of a resolver and its corresponding neutralizing capacitors.

It will be seen that I have accomplished the objects of my invention. I have provided a system for cascaded resolvers which does not require the use of buffer amplifiers between stages. My system avoids the undesirable effects which would otherwise result from direct coupling of the output of one stage of a resolver to the input of a succeeding stage. My system permits cascading of resolvers without interstage amplifiers while at the same time preventing any appreciable phase shift through the system.

It will be understood that certain features and subcombinations are of utility and may be employed without reference to other features and subcombinations. This is contemplated by and is within the scope of my claims. It is futher obvious that various changes may be made in details within the scope of my claims without departing from the spirit of my invention. It is, therefore, to be understood that my invention is not to be limited to the specific details shown and described.

Having thus described my invention, what I claims is:

1. In a chain of cascaded resolvers, a resolver, means comprising a shunt-connected capacitor for neutralizing the magnetizing inductance of the resolver and means comprising a series-connected capacitor for neutralizing the leakage inductance of the resolver.

2. In a chain of cascaded resolvers, a resolver having an input winding and having an output winding, means comprising respective series-connected capacitors associated with said input and output windings for neutralizing the leakage inductance of the resolver and means comprising a shunt-connected capacitor associated with said input winding for neutralizing the magnetizing inductance of the resolver.

3. In a chain of cascaded resolvers, a resolver having an input winding and having an output winding, means comprising respective shunt-connected capacitors associated with the input and output windings for neutralizing the magnetizing inductance of the resolver and means comprising a series-connected capacitor associated with the input winding for neutralizing the leakage inductance of the resolver.

4. In a chain of cascaded resolvers, a first resolver having an input winding and having an output winding, a second resolver having an input winding and having an output winding, means comprising a shunt-connected capacitor and a series-connected capacitor for applying an input signal to the input winding of the first resolver and means comprising a series-connected capacitor and a shunt-connected capacitor for coupling said first resolver output winding to said second resolver input winding.

5. In a chain of cascaded resolvers, a first resolver having an input winding and having an output winding, a second resolver having an input winding and having output windings, means comprising a shunt-connected capacitor and a series-connected capacitor for applying an input signal to the input winding of the first resolver, means comprising a series-connected capacitor and a shunt-connected capacitor for coupling said first resolver output winding to said second resolver input winding and means for terminating said second resolver output windings in balanced impedances.

6. In a chain of cascaded resolvers, a first resolver having an input winding and having an output winding, a second resolver having an input winding and having an output winding, means comprising a shunt-connected magnetizing-inductance-neutralizing capacitor and a series-connected leakage-reactance-neutralizing capacitor for applying a signal to said first resolver input winding and means comprising a pair of series-connected leakage-reactance-neutralizing capacitors and a shunt-connected magnetizing-inductance-neutralizing capacitor for coupling said first resolver output winding to said second resolver input winding.

7. In a chain of cascaded resolvers, a first resolver having an input winding and having an output winding, a second resolver having an input winding and having an output winding, means comprising a shunt-connected magnetizing-inductance-neutralizing capacitor and a series-connected leakage-reactance-neutralizing capacitor for applying a signal to said first resolver input winding, means comprising a pair of series-connected leakage-reactance-neutralizing capacitors and a shunt-connected magnetizing-inductance-neutralizing capacitor for coupling said first resolver output winding to said second resolver input winding and a series-connected leakage-reactance-neutralizing capacitor associated with said second resolver output winding.

8. In a chain of cascaded resolvers, a first resolver having an input winding and having an output winding, a second resolver having an input winding and havig an output winding, means comprising a series-connected leakage-reactace-neutralizing capacitor for applying an input signal to said first resolver input winding and means comprising a pair of shunt-connected magnetizing-inductance-neutralizing capacitors and a series-connected leakage-inductance-neutralizing capacitor for coupling the first resolver output winding to the second resolver input winding.

9. In a chain of cascaded resolvers, a first resolver having an input winding and having an output winding, a second resolver having an input winding and having an output winding, means comprising a series-connected leakage-reactance-neutralizing capacitor for applying an input signal to said first resolver input winding, means comprising a pair of shunt-connected magnetizing-inductance-neutralizing capacitors and a series-connected leakage-inductance-neutralizing capacitor for coupling the first resolver output winding to the second resolver input winding and a shunt-connected magnetizing-inductance-neutralizing capacitor associated with said second resolver output winding.

10. In a chain of cascaded resolvers, a first resolver having an input winding and having a pair of output windings, a second resolver having an input winding and having a pair of output windings, means comprising a shunt-connected magnetizing-inductance-neutralizing capacitor and a series-connected leakage-inductance-neutralizing capacitor for applying an input signal to said first resolver input winding, means comprising a shunt-connected magnetizing-inductance-neutralizing capacitor and a pair of series-connected leakage-inductance-neutralizing capacitors for coupling one of said first resolver output windings to said second resolver input winding and respective leakage-inductance-neutralizing capacitors associated with said other first resolver output winding and said second resolver output windings.

11. In a chain of cascaded resolvers, a first resolver having an input winding and having a pair of output windings, a second resolver having an input winding and having a pair of output windings, means comprising a shunt-connected magnetizing-inductance-neutralizing capacitor and a series-connected leakage-inductance-neutralizing capacitor for applying an input signal to said first resolver input winding, means comprising a shunt-connected magnetizing-inductance-neutralizing capacitor and a pair of series-connected leakage-inductance-neutralizing capacitors for coupling one of said first resolver output windings to said second resolver input winding, respective leakage-inductance-neutralizing capacitors associated with said other first resolver output winding and said second resolver output windings and means for terminating said other first resolver output winding and said second resolver output windings in balanced impedances.

12. In a chain of cascaded resolvers, a first resolver having an input winding and a pair of output windings, a second resolver having an input winding and having a pair of output windings, means comprising a series-connected leakage-inductance-neutralizing capacitor and a shunt-connected magnetizing-inductance-neutralizing capacitor for applying an input signal to said first resolver input winding, means comprising a pair of shunt-connected magnetizing-inductance-neutralizing capacitors and a series-connected leakage-inductance-neutralizing capacitors for coupling one of said first resolver output windings to said second resolver output winding and respective shunt-connected magnetizing-inductance-neutralizing capacitors associated with said other first resolver output winding and said second resolver output windings.

References Cited

UNITED STATES PATENTS 3,044,009 7/1962 Lang et al. __________ 235—186

OTHER REFERENCES

Weisz et al.: "Apparatus for the Transformation of Rectangular Coordinates Using Arma-Resolvers," NDRC–14, Bartol Research Foundation of The Franklin Institute, July 10, 1944.

MALCOLM A. MORRISON, *Primary Examiner.*

J. RUGGIERO, *Assistant Examiner.*